(12) United States Patent
Charlton, III et al.

(10) Patent No.: US 9,900,380 B2
(45) Date of Patent: Feb. 20, 2018

(54) COMMON FUNCTION MODULES FOR USE WITH MULTIPLE APPLICATIONS

(71) Applicant: Bank of America Corporation, Charlotte, NC (US)

(72) Inventors: Roy E. Charlton, III, Monroe, GA (US); Rafal J. Sitkowski, Old Bridge, NJ (US); Atul Patel, Bear, DE (US); John A. Lozes, Wilmington, DE (US); David W. Miller, Concord, CA (US); Raghuram Vudathu, Downingtown, PA (US); Peter Tavormina, Hainesport, NJ (US)

(73) Assignee: Bank of America Corporation, Charlotte, NC (US)

( * ) Notice: Subject to any disclaimer, the term of this patent is extended or adjusted under 35 U.S.C. 154(b) by 357 days.

(21) Appl. No.: 14/799,235

(22) Filed: Jul. 14, 2015

(65) Prior Publication Data
US 2017/0019468 A1    Jan. 19, 2017

(51) Int. Cl.
*H04L 29/08* (2006.01)
*G06F 9/54* (2006.01)

(52) U.S. Cl.
CPC .......... *H04L 67/1031* (2013.01); *G06F 9/54* (2013.01); *H04L 67/1014* (2013.01); *H04L 67/1097* (2013.01); *H04L 67/2838* (2013.01)

(58) Field of Classification Search
CPC .......... H04L 67/1031; H04L 67/1014; H04L 67/1097; H04L 67/2838; G06F 9/54
See application file for complete search history.

(56) References Cited

U.S. PATENT DOCUMENTS

| | | | |
|---|---|---|---|
| 5,724,589 A * | 3/1998 | Wold | G06F 9/542 717/100 |
| 6,851,104 B1 | 2/2005 | Rodrigues da Silva | |
| 7,149,734 B2 * | 12/2006 | Carlson | G06F 8/36 |
| 7,562,347 B2 * | 7/2009 | Baumgart | G06F 8/38 717/107 |
| 8,413,055 B2 | 4/2013 | Yuen et al. | |
| 8,689,234 B2 | 4/2014 | Macken | |
| 8,843,832 B2 | 9/2014 | Frields et al. | |
| 2006/0104306 A1 * | 5/2006 | Adamczyk | H04L 67/24 370/466 |

(Continued)

*Primary Examiner* — Larry Donaghue
(74) *Attorney, Agent, or Firm* — Michael A. Springs

(57) ABSTRACT

According to one embodiment, an apparatus includes a memory comprising instructions, an interface, and a processor communicatively coupled to the memory and the interface. The processor is configured, when executing the instructions, to receive a request to perform a first function of an application and a second function of the application and transmit the portion of the request to perform the first function to a remotely-located first common function module and the portion of the request to perform the second function to a remotely-located second common function module. The processor is further configured, when executing the instructions, to receive, in response to transmitting the respective portions of the request to the remotely-located common function modules, first information from the first common function module and second information from the second common function module, and aggregate, based on the received request, the received first information and second information.

20 Claims, 6 Drawing Sheets

(56) References Cited

U.S. PATENT DOCUMENTS

| | | | |
|---|---|---|---|
| 2006/0130152 A1* | 6/2006 | Katoh | H04L 63/101 726/29 |
| 2007/0192465 A1* | 8/2007 | Modarressi | H04L 67/10 709/223 |
| 2011/0197197 A1 | 8/2011 | Ni et al. | |
| 2011/0208788 A1* | 8/2011 | Heller | G06F 8/30 707/810 |
| 2012/0110482 A1 | 5/2012 | Zhang et al. | |
| 2012/0137227 A1 | 5/2012 | Gerken, III et al. | |

\* cited by examiner

COMMON FUNCTION MODULES FOR USE WITH MULTIPLE APPLICATIONS

TECHNICAL FIELD

This disclosure relates generally to computer applications, and more particularly to a system for utilizing remote common function modules to perform similar functions across different applications.

BACKGROUND

Enterprise application systems may utilize a number of applications that include common functionalities. Despite this, however, each application may include its own separate method for accomplishing a common functionality, creating unnecessary redundancies.

SUMMARY OF THE DISCLOSURE

In accordance with the present disclosure, disadvantages and problems associated with performing functions common to multiple applications may be reduced or eliminated.

According to one embodiment, an apparatus is provided that includes a memory comprising instructions, an interface, and a processor communicatively coupled to the memory and the interface. The processor is configured, when executing the instructions, to receive a request to perform a first function of an application and a second function of the application and transmit the portion of the request to perform the first function to a remotely-located first common function module and the portion of the request to perform the second function to a remotely-located second common function module. The processor is further configured, when executing the instructions, to receive, in response to transmitting the respective portions of the request to the remotely-located common function modules, first information from the first common function module and second information from the second common function module, and aggregate, based on the received request, the received first information and second information.

According to one embodiment, a method is provided that comprises the steps of receiving a request to perform a first function of an application and a second function of the application, transmitting the portion of the request to perform the first function to a remotely-located first common function module and the portion of the request to perform the second function to a remotely-located second common function module, receiving in response to transmitting the respective portions of the request to the remotely-located common function modules, first information from the first common function module and second information from the second common function module, and aggregating, based on the received request, the received first information and second information.

According to one embodiment, a computer-readable medium comprising instructions is provided. The instructions are configured when executed to receive a request to perform a first function of an application and a second function of the application, transmit the portion of the request to perform the first function to a remotely-located first common function module and the portion of the request to perform the second function to a remotely-located second common function module, receive in response to transmitting the respective portions of the request to the remotely-located common function modules, first information from the first common function module and second information from the second common function module, and aggregate, based on the received request, the received first information and second information.

Technical advantages of certain embodiments of the present disclosure include providing a common application function to a number of different applications using a single common function module, which may avoid duplicate developmental and maintenance costs. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
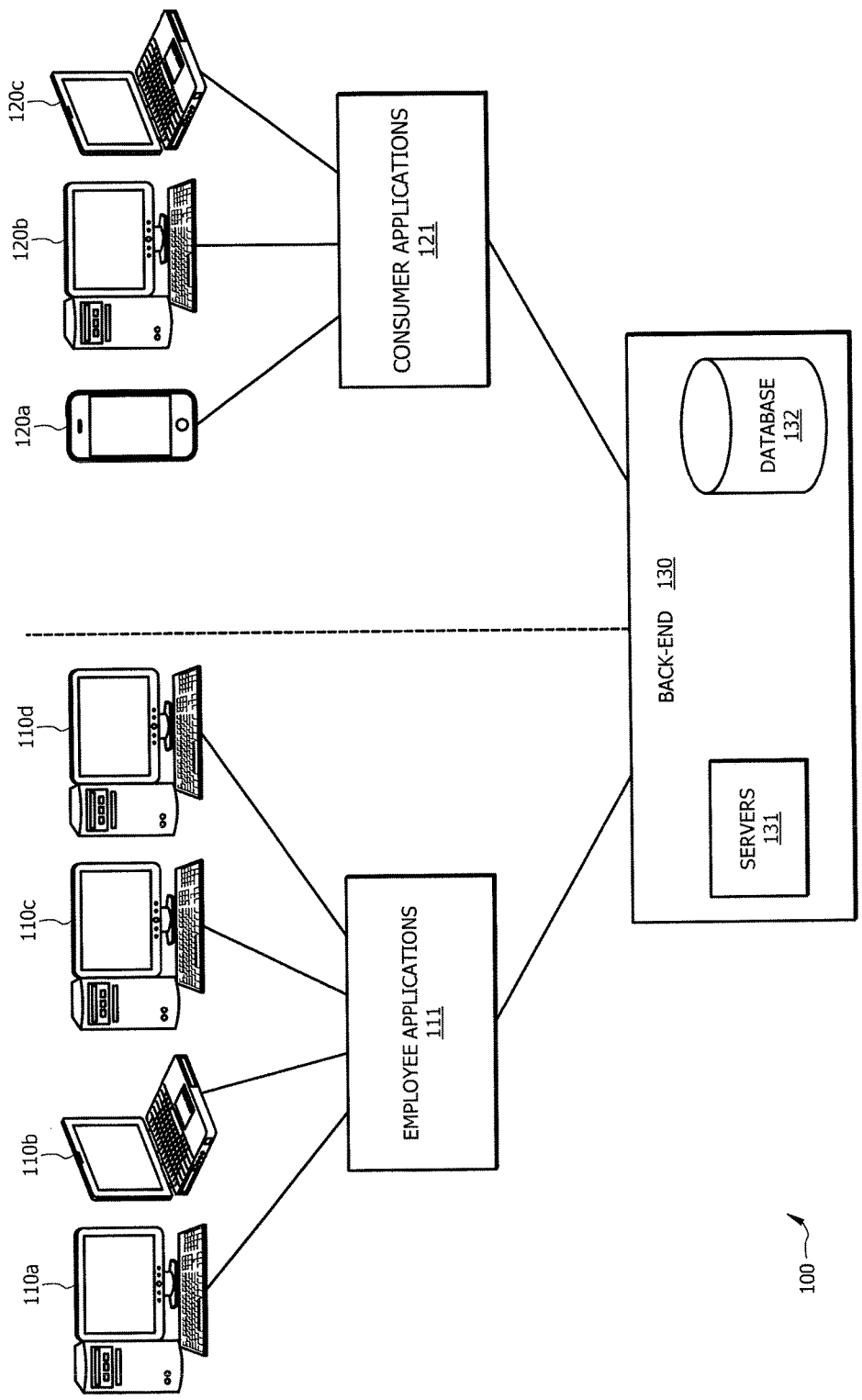
FIG. 1 illustrates an example enterprise application system, in accordance with embodiments of the present disclosure.

The present disclosure describes an enterprise application system that incorporates common function modules that may be used with any number of different applications. These common function modules may be reusable by many different applications and may be independent from one another, allowing for their integration at an end device to create higher level applications. For instance, an application container at an end device may facilitate the integration of one or more functionalities performed by common function modules along with one or more other functionalities in performing the overall functionality of a higher level application. The application container may also allow for communication between each respective common function module and the other local or remote functions of the application. Accordingly, common functionalities may be centralized, avoiding potential redundancies in development and/or maintenance.

For example, in current enterprise systems, a number of different applications may include common functionalities. Each of these applications and their respective functionalities (including those common with one another) may be developed separately, creating unnecessary redundancies and associated development and maintenance costs. As one example, certain banking systems may utilize a number of different applications for various use instances that each display similar information to the user, such as account holder information, account balances, and transaction information. Each of these applications may be designed to access, determine, gather, and/or display information from the same back-end system. However, each of the applications may be developed independently from one another with different modules for performing the same or similar functions using the same back-end system, increasing development costs. Furthermore, to modify common functionality between the applications, each of the separate applications must be modified, creating additional unnecessary application maintenance costs.

Accordingly, aspects of the present disclosure may include centralized and application-independent common function modules that may be utilized by many different applications. Because such common function modules are centralized and application-independent, development and maintenance of each module may be transferrable to each of the different applications that may utilize it. These common function modules may be located among any number of different servers and/or enterprise systems. Furthermore, applications utilizing these common function modules may be associated with the same or different back-end systems, and may be associated with the same or different businesses. Accordingly, each application, enterprise system, or business utilizing the common function module may be able to customize its functionality according to the particular needs of the respective consumer.

Utilizing aspects of the present disclosure, therefore, functionality that may be common to multiple separate applications may be consolidated into a single common function module with which each of the separate applications may communicate and interact. Systems utilizing these common function modules may decrease the complexity of the various applications running thereon, and may accordingly decrease costs associated with developing or maintaining functions in the different applications that are separate, but common.

To facilitate a better understanding of the present disclosure, the following examples of certain embodiments are given. In no way should the following examples be read to limit, or define, the scope of the disclosure. Embodiments of the present disclosure and its advantages may be best understood by referring to FIGS. 1-6, where like numbers are used to indicate like and corresponding parts.

FIG. 1 illustrates an example enterprise application system 100, in accordance with embodiments of the present disclosure. System 100 includes employee devices 110 that utilize employee-side applications 111, and customer devices 120 that utilize customer-side applications 121. Examples of employee-side applications 111 can include customer service or call center interfaces, and examples of customer-side applications 121 can include mobile or desktop applications. In particular embodiments, system 100 may be associated with a banking system, and employee-side applications 111 may be utilized by bankers, tellers, call center operators, or back office employees (e.g., fraud agents) using employee devices 110. Further, customer-side applications 111 may be utilized by customers operating customer devices 120 that may include ATM machines, online banking interfaces on a computer, or mobile devices.

Employee-side applications 111 and customer-side applications 121 each may connect and interact with the same back-end 130, which includes one or more servers 131 and one or more databases 132. Accordingly, employee-side applications 111 may incorporate the same or similar functionality as customer-side applications 121. For example, in banking system embodiments, an employee-side application 111 (e.g., a customer service agent user interface) may access similar account information (e.g., balance information) or implement similar functions (e.g., money transfers) as a customer-side application 121 (e.g., a mobile banking application). The account information and functions may thus be accessed or implemented at the same back-end 130 by each of employee-side applications 111 and customer-side applications 121. However, in current systems, each employee-side application 111 and customer-side application 121 may be developed independently from one another such that common functions are developed, implemented, and maintained separately. This may cause duplication of certain costs and efforts, as described below with respect to FIGS. 2A-2B.

Figure 2A:
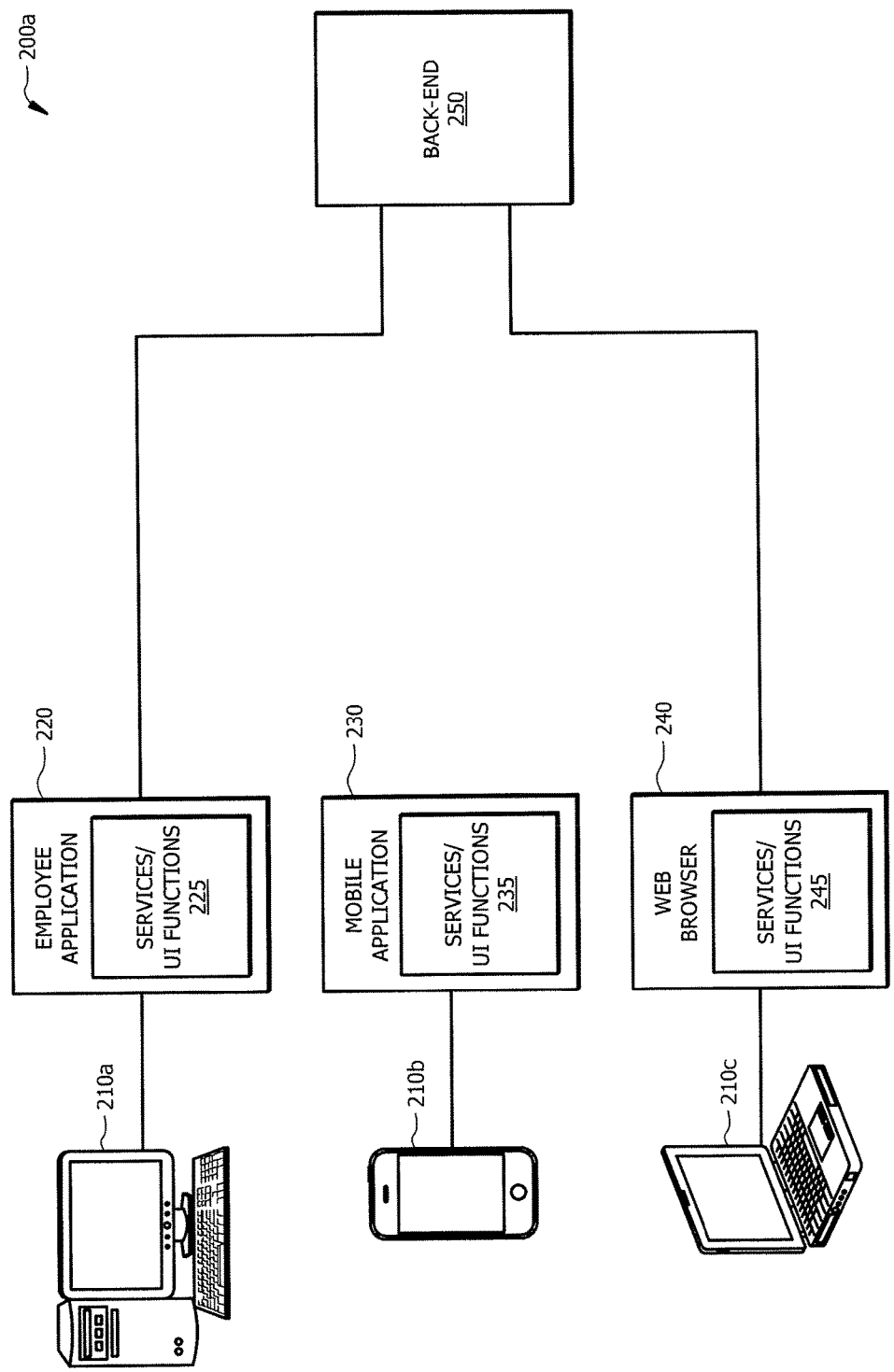
FIGS. 2A-2B illustrate example architectures of enterprise application systems, in accordance with embodiments of the present disclosure.
Figure 2B:
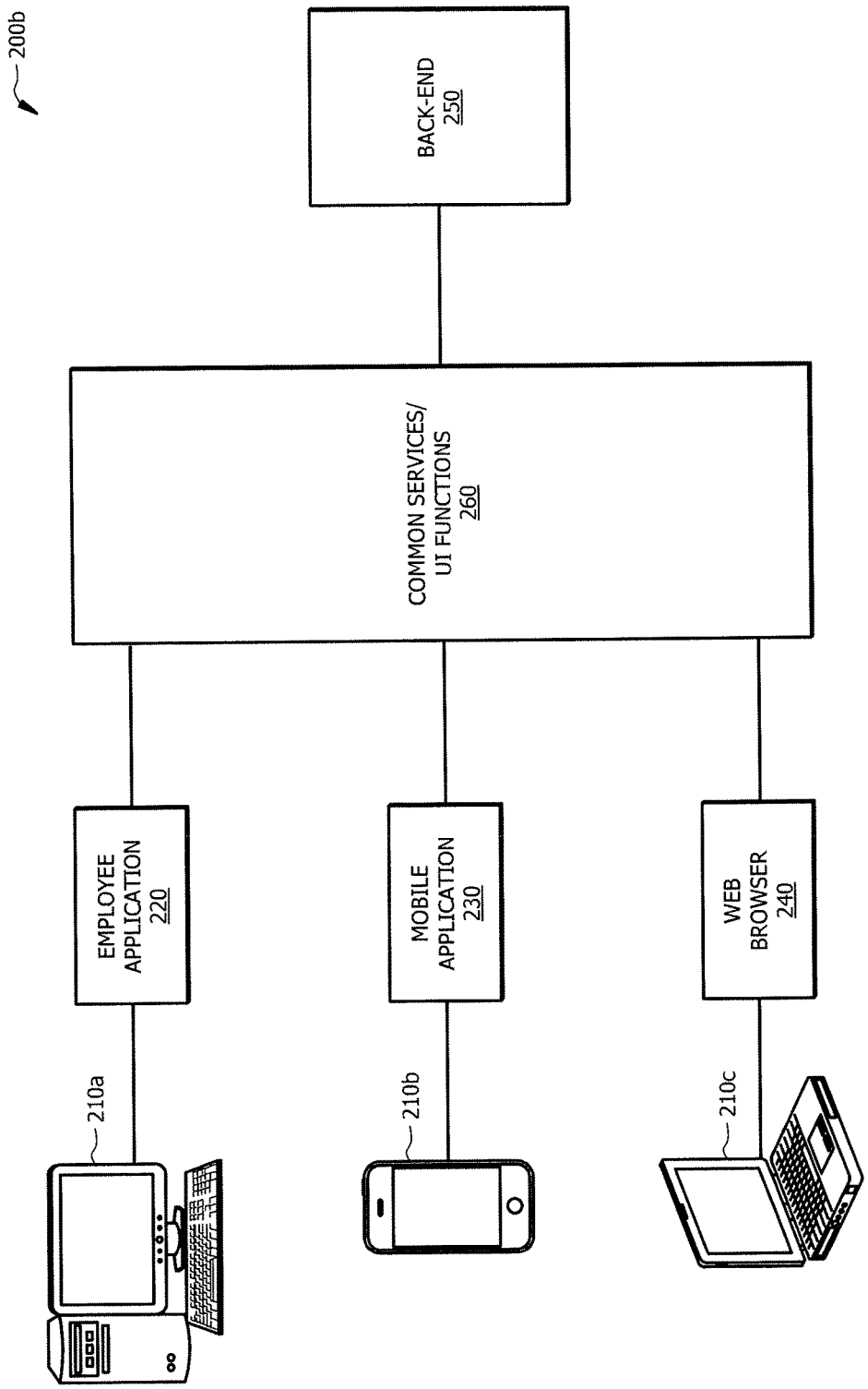

FIGS. 2A-2B illustrate example architectures of enterprise application systems 200, in accordance with embodiments of the present disclosure. In particular FIG. 2A illustrates an enterprise application system 200a with devices 210 that utilize separate applications 220, 230, and 240 with contained services and user interface functions 225, 235, and 245, respectively, similar to system 100 of FIG. 1. In certain embodiments, each service/UI function 225, 235, and 245 may implement similar functionalities for their respective applications (e.g., display balance information), as described above. However, this may lead to increased costs for the enterprise, as each service/UI function 225, 235, and 245 must be developed and maintained separately from one another. As an example, implementation of a change in the interfacing with back-end 250 must be done to each service/UI function 225, 235, and 245 in system 200a. In contrast, FIG. 2B illustrates an enterprise application system 200b that utilizes common or shared application services and UI modules 260 in accordance with embodiments of the present disclosure. By moving the common functionality of service/UI functions 225, 235, and 245 to common service/UI function 260, development and servicing of the functionality may be centralized. Further, new applications being developed may take advantage of existing functionality without requiring additional development costs.

Figure 3:
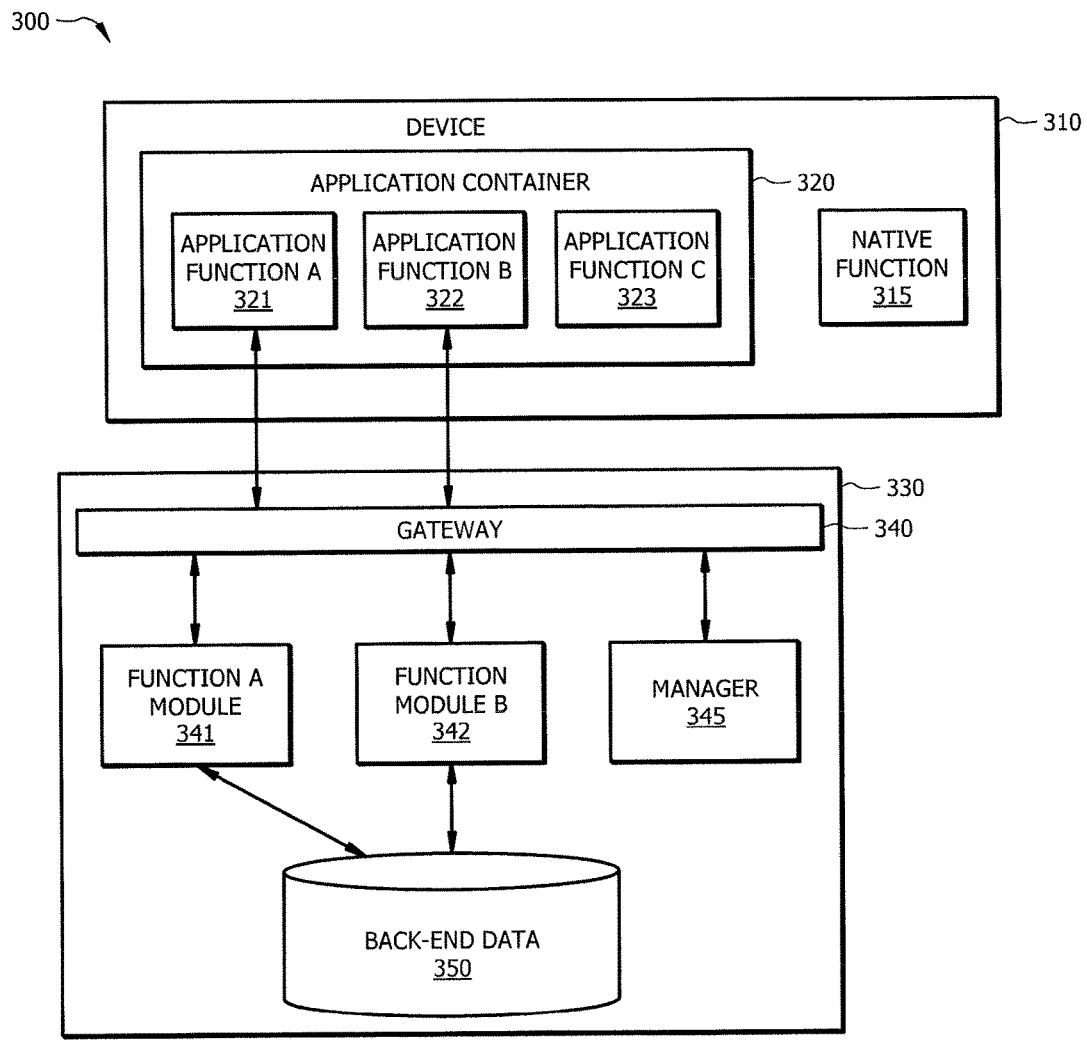
FIG. 3 illustrates an example detailed architecture of an enterprise application system, in accordance with embodiments of the present disclosure.

FIG. 3 illustrates an example detailed architecture of an enterprise application system 300, in accordance with embodiments of the present disclosure. System 300 includes a computing device 310 running an application container 320 utilizing application functions 321-323. Computing device 310 may be, for example, any one of employee devices 110 or customer devices 120 of FIG. 1, or one of devices 210 in FIG. 2B. Application container 320 may be employee-side or customer-side as described with respect to FIG. 1, and may be configured to aggregate output of application functions 321-323. In particular, application container 320 may be configured to aggregate the output of common function modules 341 and 342 for functions 321 and 322, respectively, with the output of locally-executed function 323. Common function modules 341 and 342 are located remotely on server 330, which may access or utilize data in back-end data 350. In addition to aggregating the output of application functions 321-323, application container may also facilitate communication between such functions (e.g., passing data between function 321 and function 323).

In particular embodiments, to perform functions 321 and 322, requests may be formatted in a web programming language format (e.g., JAVASCRIPT, HTML, or CSS) and transmitted to common function modules 341 and 342, respectively, on server 330. The requests may be formatted using application programming interfaces APIs associated with the particular web programming language. In certain embodiments, gateway 340 may receive the requests from computing device 310 and determine which common function module may perform each request. For instance, gateway 340 may determine that common function module 341 may process the request to perform function 321 and that common function module 342 may process the request to perform function 322. Although illustrated as being integrated with server 330, it will be understood that gateway 340 may be located in any suitable location (e.g., on a different server than server 330 hosting common function modules 341 and 342). During processing, common function modules 341 and 342 may access or utilize certain aspects of back-end data 350 in order to provide output information. After processing the respective requests, the information output from common function modules 341 and 342 (i.e., the output of the request processing) may be transmitted back to application container 320 of computing device 310.

Once received, application container 320 may aggregate the output of the common function modules 341 and 342 for application functions 321 and 322, respectively, with the output of application function 323 (which was run locally on computing device 310). In addition, application container 320 may format the aggregated information from application functions 321-323 for display to a user of computing device 310. Accordingly, while function processing for application functions 321 and 322 had been offloaded to common function modules 341 and 342 on server 330, the data aggregation and formatting for each of application functions 321-323 may still be performed on computing device 310 using application container 320. As such, the application container 320 may be developed and customized for its particular use instance without the need for duplicative function development.

In certain embodiments, application container 320 may be able to pass information, such as the information received from common function modules 341 and 342 on server 330, to and from native functions 315 of device 310 (e.g., configuration files, a card reader, or a camera). Furthermore, in certain embodiments, application container 320 may be able to pass information between local application functions, such as application function 323, and functions run remotely, such as application functions 321 and 322. In addition, although not illustrated, application container 320 may be able to pass information to and from other application containers running on computing device 310.

Server 330 may further include a manager module 345 that may include one or more rules for determining how the output of common function modules may be handled by application container 320. For instance, based on information in a request from computing device 310 (e.g., credentials of a user of computing device 310 or information associated with the type of application container 320 running on computing device 310) manager module 345 may be operable to determine how the information output from common function modules 341 and 342 may be formatted for display to a user of computing device 310. The information from manager module 345 may thus be transmitted back to application container 320 along with the output from common function modules 341 and 342. Application container 320 may then aggregate the information from common function modules 341 and 342 along with the information from manager module 345 and from locally-run application function 323 and format the aggregated information for display to or interaction by a user of computing device 310.

Modifications, additions, or omissions may be made to FIG. 3 without departing from the scope of the present disclosure. For example, although not illustrated, other computing devices running application containers for different applications may also utilize one or more of the common function modules 341 or 342 on server 330, as described below with respect to FIG. 4. Such application containers may implement different aspects of common function modules 341 or 342, in particular embodiments. As another example, any suitable number of common function modules may be included on server 330 beyond common function modules 341 and 342. Additionally, although illustrated as a single server, it will be understood that server 330 may include any suitable number of servers running common function modules similar to common function modules 341 and 342. Moreover, although illustrated as part of server 330, it will be understood that back-end data 350 may be remote from server 330 running common function modules 341 and 342, and may comprise any suitable number of servers and/or storage systems.

Figure 4:
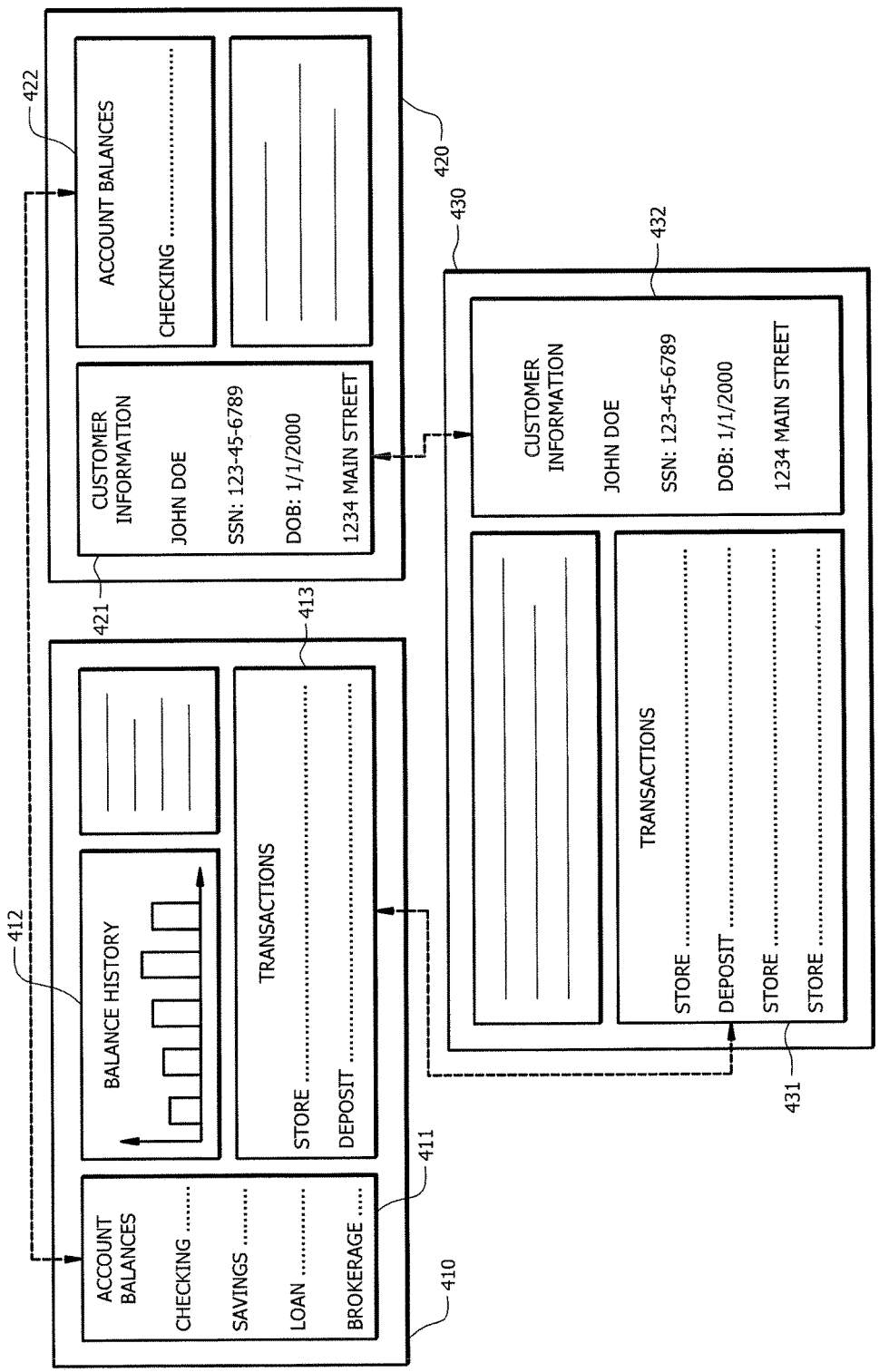
FIG. 4 illustrates an example user interface of an enterprise application system, in accordance with embodiments of the present disclosure.

FIG. 4 illustrates example user interfaces 410, 420, and 430 of an enterprise application system incorporating common function modules, in accordance with embodiments of the present disclosure. In particular, interface 410 illustrates an example application interface of an enterprise banking system that displays account balance information 411, balance history information 412, and transaction information 413 along with miscellaneous other information. Interface 420 illustrates an example application interface of an enterprise banking system that displays customer information 421 and account balance information 422 along with miscellaneous other information. Interface 430 illustrates an example application interface of an enterprise banking system that displays transaction information 431 and customer information 432 along with miscellaneous other information. In particular embodiments, interface 410 may be an interface of a customer-facing application such as a mobile banking application, while interfaces 420 and 430 may be interfaces of employee-facing applications such as those for customer service agents or fraud prevention agents.

As will be understood by those of skill in the art, each of the applications with interfaces 410, 420, and 430 utilize similar functionality. For instance, interface 410 and 420 each display some amount of account balance information, interface 410 and 430 each display some amount of transaction information, and interface 420 and 430 each display some amount of customer information. The portions of account balance information displayed between interfaces 410 and 420 may be different, depending on the application being used. Similarly, the portions of transaction information and customer information displayed in the different interfaces may differ as well. While the information displayed in different application interfaces may differ, the underlying functionality for gathering the information for display may be implemented using similar methods (e.g., the methods for gathering account balance information for each of interfaces 410 and 420 may be similar). In current systems, the functionality would be implemented by the respective applications independently. In other words, each application would include its own respective module for performing the functionality. Such modules would thus be developed and maintained independently. However, in embodiments of the present disclosure, common functionality may be provided by common function modules (e.g., common function modules 341 and 342 of FIG. 3) located on remote servers. The information provided by the common function modules may then be sent to and aggregated by application containers located on the devices running the applications. Such methods are described above with respect to FIG. 3 and below with respect to FIG. 5.

Figure 5:
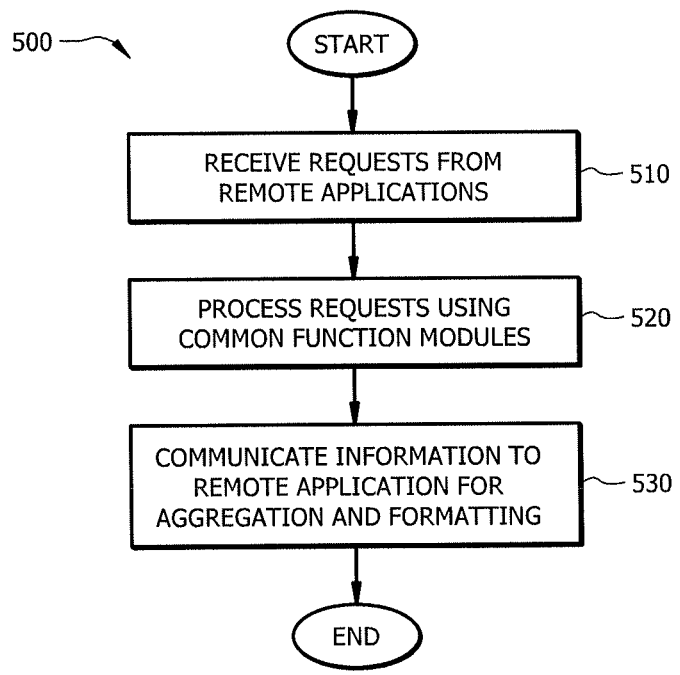
FIG. 5 illustrates example method for utilizing common function application modules of an enterprise application system, in accordance with embodiments of the present disclosure.

FIG. 5 illustrates example method 500 for utilizing common function application modules of an enterprise application system, in accordance with embodiments of the present disclosure. The method begins at step 510, where requests are received at a server from remote applications. For instance, referring to FIG. 3, step 510 may include receiving a request from application container 320 of a remote computing device 310. The requests may be formatted according to a web programming language, such as JAVASCRIPT, HTML, or CSS, and may utilize one or more APIs.

At step 520, the requests are transmitted to and processed by one or more common function modules. The common function modules may process different portions of each request. Referring again to FIG. 3, this may include processing a portion of a request to perform function 321 of application container 320 using common function module 341, and processing another portion of a request to perform function 322 of application container 320 using common function module 342. In certain embodiments, the requests transmitted to the common functions modules may use APIs that are based on the particular common function modules of the server that will process the request. For instance, referring to FIG. 3, a request originating from application container 320 may include multiple APIs, including a first API that calls a function performed by common function module 341 and a second API that calls a function performed by common function module 342. In certain embodiments, a gateway (e.g., gateway 340 of FIG. 3) may determine which modules may process the different portions of each request, and, based on the determination, may then communicate each portion of the request to a particular common function module for processing. For instance, referring to FIG. 3, gateway 340 may, based on an API in a request, determine which common function module 341 or 342 on server 330 may process the portion of the request associated with the API.

At step 530, the output of the common function modules may be communicated back to the remote application for aggregation and formatting. Referring again to FIG. 3, this step may include transmitting first information from common function module 341 and second information from common function module 342 back to application container 320 on remote computing device 310 for aggregation and formatting (e.g., aggregating and formatting the received information for display to a user of computing device 310). In addition, in certain embodiments, this step may include transmitting information from a manager module (e.g., manager module 345 of FIG. 3) that is associated with the aggregation and formatting of the first information from common function module 340 and the second information from common function module 342. Such information may include, for example, instructions for how application container 320 may format the first information and second information for display to a user of computing device 310. In certain embodiments, the information from the manager module may be based on user credentials or the type of application on computing device 310 (e.g., whether the application is a mobile banking application, customer service application, or some other type of application).

In particular embodiments, method 500 may be repeated for other requests received from other devices utilizing the common function modules. For instance, the method may continue from step 530 and may include receiving a second request from a second application of a second remote device may be received. The method may further include processing at least a portion of the second request using the first module, and processing at least a portion of the second request using a third module. The method may also include transmitting, to the second remote device for aggregation and formatting by the second application, third information from the first module and fourth information from the second module. Because the first application and second application utilized the same common function module (i.e., the first module), at least a portion of the first information may be the same as at least a portion of the third information.

Modifications, additions, or omissions may be made to method 500 without departing from the scope of the present disclosure. For example, the order of the steps may be performed in a different manner than that described and some steps may be performed at the same time. Additionally, each individual step may include additional steps without departing from the scope of the present disclosure.

Figure 6:
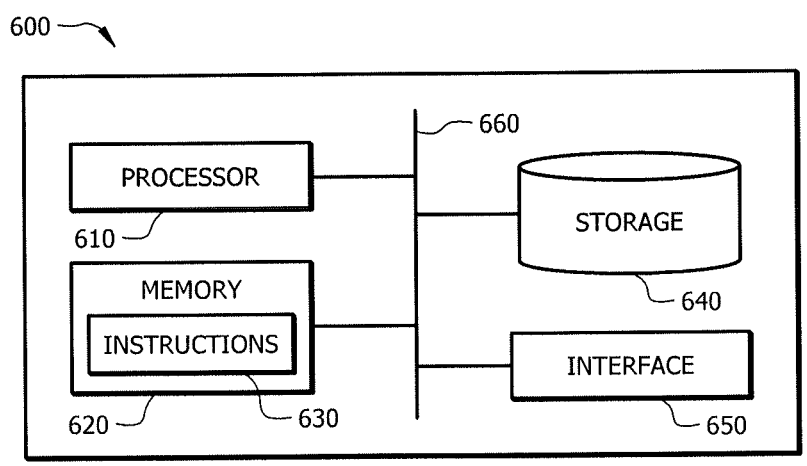
FIG. 6 illustrates an example computer system, in accordance with embodiments of the present disclosure.

FIG. 6 illustrates an example computer system 600, in accordance with embodiments of the present disclosure. One or more aspects of computer system 600 may be used in employee devices 110, customer devices 120, and back-end 130 of FIG. 1, devices 210 and/or back-end 250 of FIGS. 2A-2B, and computing device 310 and/or in server 330 of FIG. 3.

Computer system 600 may include a processor 610, memory 620 comprising instructions 630, storage 640, interface 650, and bus 660. These components may work together to perform one or more steps of one or more methods (e.g. method 500 of FIG. 5) and provide the functionality described herein. For example, in particular embodiments, instructions 630 in memory 620 may be executed on processor 610 in order to process requests received by interface 650 using common function modules. In certain embodiments, instructions 630 may reside in storage 640 instead of, or in addition to, memory 620.

Processor 610 may be a microprocessor, controller, application specific integrated circuit (ASIC), or any other suitable device or logic operable to provide, either alone or in conjunction with other components (e.g., memory 620 and instructions 630) functionality according to the present disclosure. Such functionality may include processing application functions using remotely-located common function modules, as discussed herein. In particular embodiments, processor 610 may include hardware for executing instructions 630, such as those making up a computer program or application. As an example and not by way of limitation, to execute instructions 630, processor 610 may retrieve (or fetch) instructions 630 from an internal register, an internal cache, memory 620, or storage 640; decode and execute them; and then write one or more results of the execution to an internal register, an internal cache, memory 620, or storage 640.

Memory 620 may be any form of volatile or non-volatile memory including, without limitation, magnetic media, optical media, random access memory (RAM), read-only memory (ROM), flash memory, removable media, or any other suitable local or remote memory component or components. Memory 620 may store any suitable data or information utilized by computer system 600, including software (e.g., instructions 630) embedded in a computer readable medium, and/or encoded logic incorporated in hardware or otherwise stored (e.g., firmware). In particular embodiments, memory 620 may include main memory for storing instructions 630 for processor 610 to execute or data for processor 610 to operate on. In particular embodiments, one or more memory management units (MMUs) may reside between processor 610 and memory 620 and facilitate accesses to memory 620 requested by processor 610.

Storage 640 may include mass storage for data or instructions (e.g., instructions 630). As an example and not by way of limitation, storage 640 may include a hard disk drive (HDD), a floppy disk drive, flash memory, an optical disc, a magneto-optical disc, magnetic tape, a Universal Serial Bus (USB) drive, a combination of two or more of these, or any suitable computer readable medium. Storage 640 may include removable or non-removable (or fixed) media, where appropriate. Storage 640 may be internal or external to computer system 600, where appropriate. In some embodiments, instructions 630 may be encoded in storage 640 in addition to, in lieu of, memory 620.

Interface 650 may include hardware, encoded software, or both providing one or more interfaces for communication (such as, for example, packet-based communication) between computer systems on a network (e.g., between employee devices 110 and back-end 130 of FIG. 1). As an example, and not by way of limitation, interface 650 may include a network interface controller (NIC) or network adapter for communicating with an Ethernet or other wire-based network and/or a wireless NIC (WNIC) or wireless adapter for communicating with a wireless network. Interface 650 may include one or more connectors for communicating traffic (e.g., IP packets) via a bridge card. Depending on the embodiment, interface 650 may be any type of interface suitable for any type of network in which computer system 600 is used. In some embodiments, interface 650 may include one or more interfaces for one or more I/O devices. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these.

Bus 660 may include any combination of hardware, software embedded in a computer readable medium, and/or encoded logic incorporated in hardware or otherwise stored (e.g., firmware) to communicably couple components of computer system 600 to each other. As an example and not by way of limitation, bus 660 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 660 may include any number, type, and/or configuration of buses 660, where appropriate. In particular embodiments, one or more buses 660 (which may each include an address bus and a data bus) may couple processor 610 to memory 620. Bus 660 may include one or more memory buses.

Modifications, additions, or omissions may be made to FIG. 6 without departing from the scope of the present disclosure. For example, FIG. 6 illustrates components of computer system 600 in a particular configuration. However, any configuration of processor 610, memory 620, instructions 630, storage 640, interface 650, and bus 660 may be used, including the use of multiple processors 610 and/or buses 660. In addition, computer system 600 may be physical or virtual.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. An apparatus, comprising:
   a memory comprising instructions;
   an interface;
   a processor communicatively coupled to the memory and the interface and configured, when executing the instructions, to:
      receive, by the interface, a request to perform a first function of an application and a second function of the application;
      transmit, by the interface, the portion of the request to perform the first function to a remotely-located first common function module and the portion of the request to perform the second function to a remotely-located second common function module;
      receive, by the interface, in response to transmitting the respective portions of the request to the remotely-located common function modules, first information from the first common function module and second information from the second common function module; and
      aggregate, based on the received request, the received first information and second information.

2. The apparatus of claim 1, wherein the received request further comprises a request to perform a third function of the application, and the processor is further configured, when executing the instructions, to:
   process the third function locally to yield third information; and
   aggregate, based on the received request, the third information with the first information and second information.

3. The apparatus of claim 2, wherein the processor is further configured, when executing the instructions, to perform the third function using the first information from the first common function module.

4. The apparatus of claim 1, wherein the processor is further configured, when executing the instructions, to:
   receive, from a remotely-located manager module, aggregation information comprising one or more rules for aggregating the first information and the second information; and
   aggregate the first information and second information according to the received aggregation information.

5. The apparatus of claim 1, wherein the processor is further configured, when executing the instructions, to transmit the portion of the request to perform the first function to the remotely-located first common function module using a gateway.

6. The apparatus of claim 1, wherein the portion of the request to perform the first function is transmitted to the first common function module using an application programming interface (API).

7. The apparatus of claim 1, wherein the portion of the request to perform the first function is transmitted to the first common function module according to a web programming language.

8. An method, comprising:
receiving a request to perform a first function of an application and a second function of the application;
transmitting the portion of the request to perform the first function to a remotely-located first common function module and the portion of the request to perform the second function to a remotely-located second common function module;
receiving in response to transmitting the respective portions of the request to the remotely-located common function modules, first information from the first common function module and second information from the second common function module; and
aggregating, based on the received request, the received first information and second information.

9. The method of claim 8, wherein the received request further comprises a request to perform a third function of the application, and the method further comprises:
processing the third function locally to yield third information; and
aggregating, based on the received request, the third information with the first information and second information.

10. The method of claim 9, further comprising performing the third function using the first information from the first common function module.

11. The method of claim 8, further comprising:
receiving, from a remotely-located manager module, aggregation information comprising one or more rules for aggregating the first information and the second information; and
aggregating the first information and second information according to the received aggregation information.

12. The method of claim 8, further comprising transmitting the portion of the request to perform the first function to the remotely-located first common function module using a gateway.

13. The method of claim 8, wherein the portion of the request to perform the first function is transmitted to the first common function module using an application programming interface (API).

14. The method of claim 8, wherein the portion of the request to perform the first function is transmitted to the first common function module according to a web programming language.

15. A computer-readable medium comprising instructions configured, when executed by a processor, to:
receive a request to perform a first function of an application and a second function of the application;
transmit the portion of the request to perform the first function to a remotely-located first common function module and the portion of the request to perform the second function to a remotely-located second common function module;
receive in response to transmitting the respective portions of the request to the remotely-located common function modules, first information from the first common function module and second information from the second common function module; and
aggregate, based on the received request, the received first information and second information.

16. The computer-readable medium of claim 15, wherein the received request further comprises a request to perform a third function of the application, and the instructions are further configured, when executed, to:
process the third function locally to yield third information; and
aggregate, based on the received request, the third information with the first information and second information.

17. The computer-readable medium of claim 16, wherein the instructions are further configured, when executed, to perform the third function using the first information from the first common function module.

18. The computer-readable medium of claim 15, wherein the instructions are further configured, when executed, to:
receive, from a remotely-located manager module, aggregation information comprising one or more rules for aggregating the first information and the second information; and
aggregate the first information and second information according to the received aggregation information.

19. The computer-readable medium of claim 15, wherein the instructions are further configured, when executed, to transmit the portion of the request to perform the first function to the remotely-located first common function module using a gateway.

20. The computer-readable medium of claim 15, wherein the portion of the request to perform the first function is transmitted to the first common function module using an application programming interface (API).

* * * * *